United States Patent
Puckett et al.

(10) Patent No.: US 10,768,364 B1
(45) Date of Patent: Sep. 8, 2020

(54) HIGH-EFFICIENCY, HIGH-DIVERGENCE CHIP-SCALE EMITTER USING A WAVEGUIDE DEFECT BETWEEN RESONANT GRATINGS

(71) Applicant: Honeywell International Inc., Morris Plains, NJ (US)

(72) Inventors: Matthew Wade Puckett, Scottsdale, AZ (US); Neil A. Krueger, Saint Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/512,227

(22) Filed: Jul. 15, 2019

(51) Int. Cl.
*G02B 6/12* (2006.01)
*G02B 6/124* (2006.01)
*G02B 6/293* (2006.01)

(52) U.S. Cl.
CPC ......... *G02B 6/12014* (2013.01); *G02B 6/124* (2013.01); *G02B 6/29301* (2013.01); *G02B 6/29395* (2013.01); *G02B 2006/12107* (2013.01)

(58) Field of Classification Search
CPC .............. G02B 6/12014; G02B 6/124; G02B 6/29395; G02B 6/29301; G02B 2006/12107
See application file for complete search history.

(56) References Cited

U.S. PATENT DOCUMENTS

| | | | | |
|---|---|---|---|---|
| 5,239,183 A * | 8/1993 | Kouno | ................. | G01B 11/026 250/559.31 |
| 5,585,957 A * | 12/1996 | Nakao | ................... | B82Y 20/00 257/13 |
| 5,689,358 A * | 11/1997 | Nakao | ................... | B82Y 20/00 257/13 |
| 5,692,077 A * | 11/1997 | Stone | ................... | G02B 6/2861 385/16 |
| 6,459,840 B1 * | 10/2002 | Sato | ....................... | B82Y 20/00 372/50.1 |
| 6,597,721 B1 | 7/2003 | Hutchinson et al. | | |
| 6,606,443 B2 * | 8/2003 | Sato | ....................... | B82Y 20/00 372/50.1 |
| 6,885,686 B2 * | 4/2005 | Botez | ..................... | B82Y 20/00 372/102 |
| 6,920,272 B2 * | 7/2005 | Wang | ................. | G02B 6/12004 359/332 |
| 6,963,118 B2 * | 11/2005 | Deliwala | ................ | B82Y 20/00 257/428 |
| 7,457,340 B2 * | 11/2008 | Botez | ..................... | B82Y 20/00 372/50.11 |

(Continued)

OTHER PUBLICATIONS

Baghban et al., "Bragg gratings in thin-film LiNbO3 waveguides", Optics Express 32323, Dec. 25, 2017, pp. 1-10, vol. 25, No. 26.

(Continued)

*Primary Examiner* — Andrew Jordan
(74) *Attorney, Agent, or Firm* — Fogg & Powers LLC (57) ABSTRACT

In one example, a chip-scale emitter includes a resonator formed in a waveguide, wherein the resonator includes a first grating formed in the waveguide and a second grating formed in the waveguide that is separate from the first grating; and a scattering element consisting of a single defect in the waveguide, wherein the scattering element is positioned between the first grating and the second grating in the waveguide.

20 Claims, 6 Drawing Sheets

(56) References Cited

U.S. PATENT DOCUMENTS

| | | | |
|---|---|---|---|
| 7,564,612 B2 | 7/2009 | Chui | |
| 7,634,165 B2* | 12/2009 | Wang | G02B 6/12004 385/129 |
| 7,693,361 B2* | 4/2010 | Leem | G02B 6/12004 372/30 |
| 8,200,054 B1* | 6/2012 | Li | G02B 6/124 369/13.3 |
| 8,311,374 B2 | 11/2012 | Hochberg et al. | |
| 8,380,016 B1* | 2/2013 | Hochberg | G02F 1/2257 385/131 |
| 8,405,899 B2* | 3/2013 | Chui | G02B 26/001 359/223.1 |
| 8,434,909 B2* | 5/2013 | Nichol | G02B 6/0018 362/296.01 |
| 8,905,610 B2* | 12/2014 | Coleman | G02B 6/0075 362/554 |
| 8,950,902 B2* | 2/2015 | Nichol | G02B 6/0018 362/296.01 |
| 9,028,123 B2* | 5/2015 | Nichol | G02B 6/0076 349/63 |
| 9,081,252 B2* | 7/2015 | Aflatouni | G02B 6/34 |
| 9,110,200 B2* | 8/2015 | Nichol | G02B 6/0068 |
| 9,523,807 B2* | 12/2016 | Nichol | G02B 6/0036 |
| 9,557,473 B2* | 1/2017 | Nichol | G02B 6/0076 |
| 9,683,928 B2* | 6/2017 | Swanson | G01B 9/02051 |
| 9,784,914 B2* | 10/2017 | Jiang | G02B 6/122 |
| 9,819,151 B2* | 11/2017 | Santis | H01S 5/021 |
| 9,933,554 B2* | 4/2018 | Santis | G02B 6/00 |
| 9,979,061 B1* | 5/2018 | Droz | H01P 3/16 |
| 10,101,630 B2* | 10/2018 | Watts | G02B 6/1223 |
| 10,175,413 B2* | 1/2019 | Nichol | G02B 6/0011 |
| 10,191,145 B2 | 1/2019 | Swanson | |
| 10,203,399 B2* | 2/2019 | Retterath | G01S 17/10 |
| 10,261,388 B2* | 4/2019 | Pruessner | G01S 7/4813 |
| 10,263,309 B1* | 4/2019 | Droz | H01P 5/02 |
| 10,393,941 B2* | 8/2019 | Nichol | G02B 6/0018 |
| 10,416,288 B2* | 9/2019 | Swanson | G01B 9/02004 |
| 10,429,588 B1* | 10/2019 | Yoo | G01S 7/4814 |
| 10,466,409 B2* | 11/2019 | Nichol | G02B 6/0018 |
| 10,557,880 B2* | 2/2020 | Schubert | H01S 3/1118 |
| 10,594,011 B1* | 3/2020 | Droz | H01P 1/068 |
| 10,627,485 B2* | 4/2020 | Swanson | G01B 9/02091 |
| 10,634,845 B2* | 4/2020 | Aflatouni | G02F 1/292 |
| 2002/0018620 A1* | 2/2002 | Koyama | H01L 51/5275 385/37 |
| 2005/0031002 A1* | 2/2005 | Botez | H01S 5/42 372/50.11 |
| 2005/0238079 A1* | 10/2005 | Botez | H01S 5/42 372/96 |
| 2006/0067651 A1* | 3/2006 | Chui | G02B 26/001 385/147 |
| 2009/0092159 A1* | 4/2009 | Kato | H01S 5/06256 372/20 |
| 2009/0279162 A1* | 11/2009 | Chui | G02B 26/001 359/290 |
| 2010/0187442 A1* | 7/2010 | Hochberg | G01S 7/4814 250/492.1 |
| 2011/0222814 A1* | 9/2011 | Krill | G02B 6/12004 385/3 |
| 2011/0227487 A1* | 9/2011 | Nichol | G02B 6/0068 315/158 |
| 2011/0255303 A1* | 10/2011 | Nichol | G02B 6/0018 362/606 |
| 2011/0273906 A1* | 11/2011 | Nichol | G02B 6/0088 362/607 |
| 2011/0277361 A1* | 11/2011 | Nichol | G02B 6/0068 40/541 |
| 2013/0155723 A1* | 6/2013 | Coleman | G02B 6/0018 362/621 |
| 2013/0250618 A1* | 9/2013 | Nichol | G02B 6/0068 362/618 |
| 2014/0049983 A1* | 2/2014 | Nichol | G02B 6/0028 362/610 |
| 2014/0055832 A1* | 2/2014 | Aflatouni | G02B 6/124 359/238 |
| 2014/0376001 A1* | 12/2014 | Swanson | G01B 9/02004 356/479 |
| 2015/0078035 A1* | 3/2015 | Nichol | G02B 6/0076 362/622 |
| 2015/0131080 A1* | 5/2015 | Retterath | G01S 17/93 356/5.01 |
| 2015/0219834 A1* | 8/2015 | Nichol | G02B 6/006 362/607 |
| 2015/0286006 A1* | 10/2015 | Chang-Hasnain | G02B 6/12007 136/259 |
| 2015/0333480 A1* | 11/2015 | Santis | H01S 5/021 372/45.01 |
| 2016/0261091 A1* | 9/2016 | Santis | H01S 5/1032 |
| 2017/0045669 A1* | 2/2017 | Nichol | G02B 6/006 |
| 2017/0168233 A1* | 6/2017 | Aflatouni | G02B 6/124 |
| 2017/0268987 A1* | 9/2017 | Swanson | G01B 9/02069 |
| 2017/0268988 A1* | 9/2017 | Swanson | G01S 7/4812 |
| 2017/0299500 A1* | 10/2017 | Swanson | G01B 9/02051 |
| 2017/0299697 A1* | 10/2017 | Swanson | G01S 7/4812 |
| 2017/0315387 A1* | 11/2017 | Watts | G02B 6/29331 |
| 2017/0315420 A1* | 11/2017 | Watts | G02F 1/225 |
| 2018/0052274 A1* | 2/2018 | Nichol | G02B 6/0018 |
| 2018/0306925 A1 | 10/2018 | Hosseini et al. | |
| 2019/0072600 A1 | 3/2019 | Schubert et al. | |
| 2019/0170928 A1* | 6/2019 | Nichol | G02B 6/0028 |
| 2019/0212627 A1* | 7/2019 | Watts | G02B 6/1223 |
| 2019/0219884 A1* | 7/2019 | Watts | G02F 1/025 |
| 2019/0219885 A1* | 7/2019 | Watts | G02B 6/29331 |
| 2019/0219886 A1* | 7/2019 | Watts | G02F 1/225 |
| 2019/0260123 A1* | 8/2019 | Poulton | H01Q 3/2676 |
| 2019/0285732 A1* | 9/2019 | Retterath | G01S 17/93 |
| 2019/0391271 A1* | 12/2019 | Goodwill | G01S 17/10 |
| 2020/0064540 A1* | 2/2020 | Nichol | G02B 6/006 |
| 2020/0064628 A1* | 2/2020 | Mirabella | G02B 27/0093 |

OTHER PUBLICATIONS

Phare et al., "Silicon Optical Phased Array with High-Efficiency Beam Formation over 180 Degree Field of View", Feb. 13, 2018, pp. 1-12.

Raval et al., "Unidirectional waveguide grating antennas with uniform emission for optical phased arrays", Optics Letters, Jun. 28, 2017, pp. 1-6, The Optical Society.

Zhu et al., "Ultra-compact silicon nitride grating coupler for microscopy systems", Optics Express 33297, Dec. 25, 2017, pp. 1-8, vol. 25, No. 26.

\* cited by examiner

HIGH-EFFICIENCY, HIGH-DIVERGENCE CHIP-SCALE EMITTER USING A WAVEGUIDE DEFECT BETWEEN RESONANT GRATINGS

BACKGROUND

In the fields of navigation, sensing, and information technology, there is a growing need for energy-efficient emitters of highly divergent coherent light. In Light Detection and Ranging (LIDAR), for example, the angular range over which distance can be measured without physically moving any parts is fundamentally limited by the divergence of the individual emitters which make up an optical phased array. Similarly, in emerging Light-Fidelity (Li-Fi) technologies, it is desirable to transmit data in the optical domain over the greatest angular range possible. To do this in a device with low size, weight, and power consumption, it can be advantageous to have an optical source and emitter co-integrated in a photonics chip. However, current solutions fail to smoothly distribute the light propagating in a waveguide across a broad angular range. As a chip-scale emitter becomes larger its efficiency can be increased, but this necessarily reduces the emission divergence because the effective aperture size increases.

SUMMARY

In one example, a chip-scale emitter includes a resonator formed in a waveguide. The resonator includes a first grating formed in the waveguide and a second grating formed in the waveguide that is separate from the first grating. The chip-scale emitter further includes a scattering element consisting of a single defect in the waveguide, wherein the scattering element is positioned between the first grating and the second grating in the waveguide.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Typically, emitters include a waveguide and a scattering element to decouple light into free space. The scattering element can be formed in the surface of the waveguide as a periodic grating etched into the depth of the waveguide. The angle of the light decoupling can be controlled or tuned based on the periodicity of the grating, and the strength of the decoupled light can be controlled or tuned based on the depth of the grating. A longer scattering element structure (for example, a few microns) having multiple periods is generally used to achieve a more uniform and proper coupling of light. The scattering element structure takes some of the mode (optical signal in the waveguide) and forces it to leak out into free space. The light from each scattering element will overlap with light from other scattering elements that are, for example, part of an optical phased array. Current designs do not have sufficient divergence and efficiency to be viable for LIDAR and Li-Fi applications. In some situations, approximately 10 mW of optical power needs to be provided to a scattering element in order to obtain approximately 1 mW of optical power output.

To generate higher divergence, the example chip-scale emitters described herein include a scattering element with only a single emitting defect. Single defects can emit light with extremely high divergence, but this comes at the cost of emission efficiency. To improve emission efficiency, the scattering element of the example chip-scale emitters is positioned inside a resonator formed in the waveguide. Positioning the scattering element inside a resonator advantageously increases the average number of times that a photon passes through the single defect without increasing the size of the scattering element. Accordingly, the chip-scale emitters described herein provide higher divergence and efficiency in a smaller size compared to conventional implementations. The example chip-scale emitters can be included on a photonics chip and/or incorporated into an optical phased array and can be particularly advantageous for LiDAR and Li-Fi applications.

Figure 1:
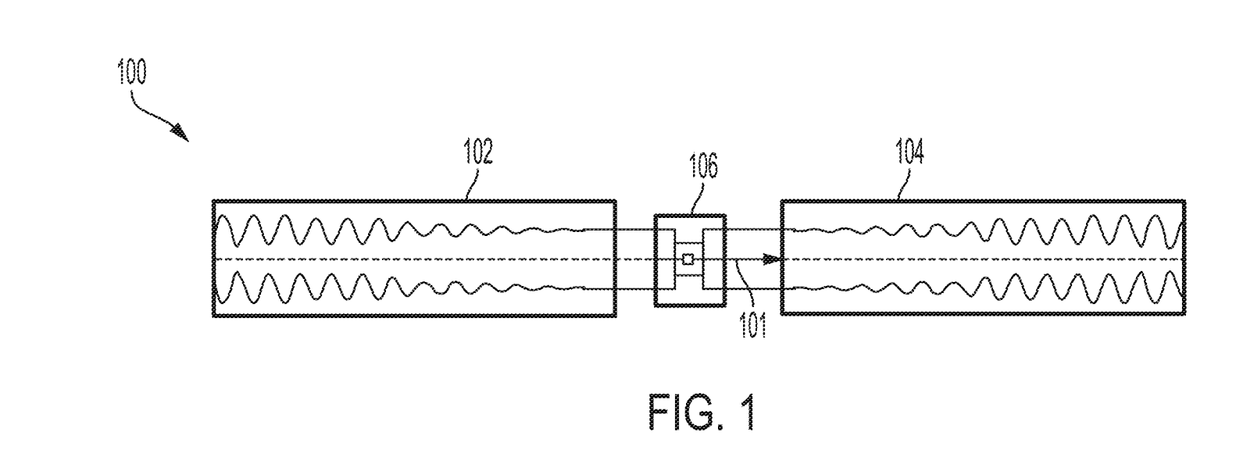
FIG. 1 is a schematic diagram of an example chip-scale emitter.

FIG. 1 is a schematic diagram of an example chip-scale emitter 100. In the example shown in FIG. 1, the chip-scale emitter 100 includes a first grating 102, a second grating 104, and a scattering element 106 formed in a waveguide 101.

The waveguide 101 of the chip-scale emitter 100 is generally formed from a material that has a refractive index greater than about 1.6. In some examples, the waveguide material is silicon nitride. In other examples, the waveguide material can be silicon, titanium dioxide, aluminum oxide, hafnium oxide, lithium niobite, or any other material having a refractive index greater than about 1.6.

In some examples, the waveguide 101 is covered with a cladding material having a refractive index less than the refractive index of the waveguide material (for example, less than about 1.6). In some examples where the waveguide material is silicon nitride, the cladding material is silicon dioxide. In other examples, the cladding material can be formed from any material having a refractive index less than the waveguide material, so the particular cladding material is dependent on (or paired with) the waveguide material.

In the example shown in FIG. 1, the first grating 102 and the second grating 104 are separated from each other in the waveguide 101 and form a resonator in the waveguide 101. In the example shown in FIG. 1, the first grating 102 and the second grating 104 are each formed by periodically varying the width of the waveguide 101 in a manner that creates a highly reflective segment and mimics a mirror. In some examples, the first grating 102 and the second grating 104 have a sine wave pattern. In other examples, the first grating 102 and the second grating 104 could have other periodically varying patterns (such as, for example, a square wave pattern). In some examples, the first grating 102 and the second grating 104 are Bragg mirrors (also referred to as Bragg reflectors).

In some examples, the chip-scale emitter 100 is designed to diffract out two or more wavelengths of light. In such examples, the first grating 102 and the second grating 104 are formed by varying the width of the waveguide in a non-periodic manner that creates a highly reflective segment and mimics a mirror. In examples where the chip-scale emitter 100 is designed to diffract two wavelengths, the non-periodic pattern includes two grating patterns with different periods that are superimposed.

In other examples, the first grating 102 and the second grating 104 are formed with a periodic array of holes in the waveguide 101 in addition to (or instead of) periodically varying the width of the waveguide 101. In such examples, the holes are sub-wavelength in the waveguide 101 and are sufficiently small such that the collection of holes is highly reflective but do not operate as efficient scattering elements due to the periodicity of their positions. The shape, size, and/or pitch/spacing of the sub-wavelength holes can be selected to accommodate the desired reflectivity of the first grating 102 and the second grating 104 and mimic mirrors. In some examples, the size of the sub-wavelength holes is apodized such that the size of the sub-wavelength holes is reduced near the scattering element 106, which is beneficial for reducing loss for the chip-scale emitter 100 and reducing scattering of light other than the intended scattering with the scattering element 106.

In the example shown in FIG. 1, the amplitude of the pattern for the first grating 102 and the second grating 104 is apodized such that the width of the amplitude of the periodic pattern forming the first grating 102 and the second grating 104 is reduced near the scattering element 106. The apodization of the first grating 102 and the second grating 104 is beneficial for reducing loss for the chip-scale emitter 100 and reducing scattering of light other than the intended scattering with the scattering element 106.

The scattering element of the chip-scale emitter 100 is a single defect in the waveguide 101. The scattering element 106 is positioned between the first grating 102 and the second grating 104 in the waveguide 101 such that the scattering element 106 is within the resonator formed by the first grating 102 and the second grating 104. In the example shown in FIG. 1, the single defect in the waveguide 101 that forms the scattering element 106 is an abrupt change in the width of the waveguide 101. The single defect in the waveguide 101 decouples light from the waveguide 101 with high divergence. In some examples, the abrupt change in width is an abrupt reduction of approximately 50% of the width of the waveguide 101. The dimensions of the single defect in the waveguide 101 can be selected based on the desired emission pattern or profile for the chip-scale emitter 100. For example, the length of the single defect or the percentage of reduction of the width of the waveguide 101 can be selected in order to produce the desired far-field emission pattern or profile.

In operation, an optical signal (for example, from a light source) is coupled into the chip-scale emitter 100 from a waveguide optically coupled to the chip-scale emitter 100. The optical signal enters the chip-scale emitter 100 at the side of the first grating 102 and resonates within the optical cavity (resonator) formed by the first grating 102 and the second grating 104. The light propagates through (is sampled by) the single defect in the waveguide 101 that forms the scattering element 106 multiple times as it is reflected by the first grating 102 and the second grating 104. Due to the additional sampling of light, the single defect in the waveguide 101 that forms the scattering element 106, and the chip-scale emitter 100 generally, provides a highly divergent output at a power level that is significantly improved compared to grating couplers or a single defect included without a resonator.

Figure 2A:
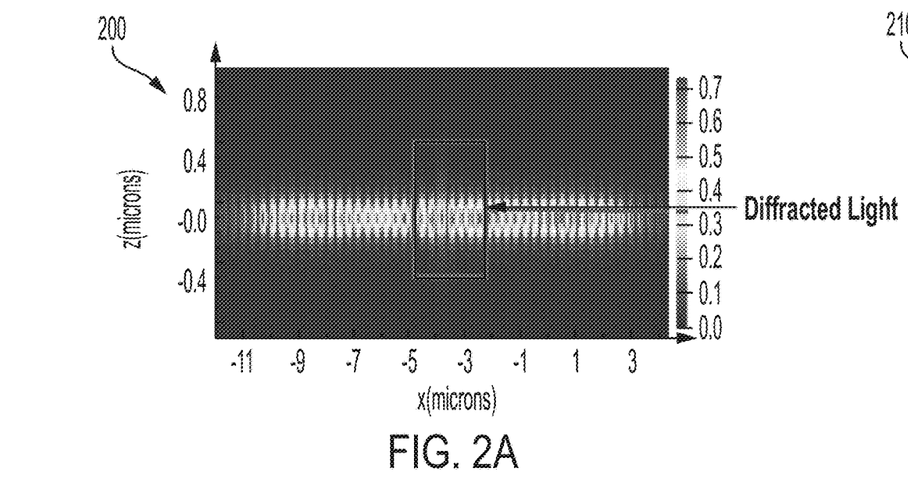
FIG. 2A is a simulated near-field emission profile for the chip-scale emitter of FIG. 1.
Figure 2B:
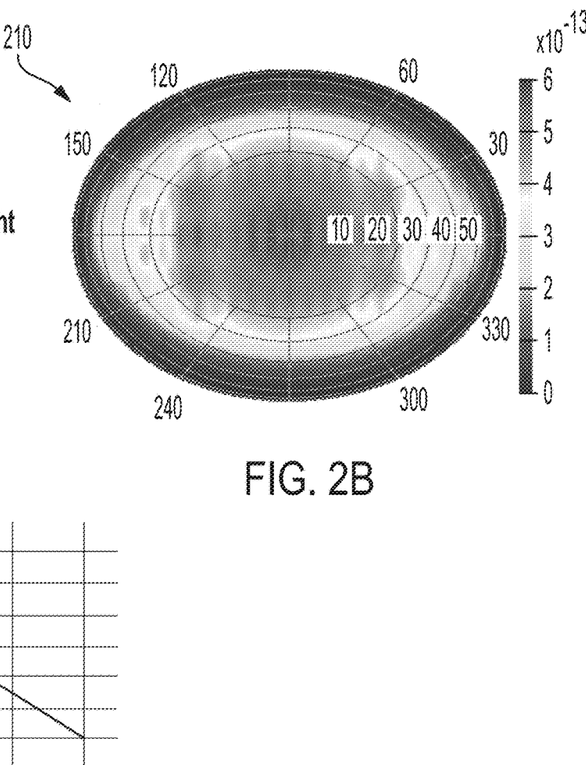
FIG. 2B is a simulated far-field emission profile for the chip-scale emitter of FIG. 1.
Figure 2C:
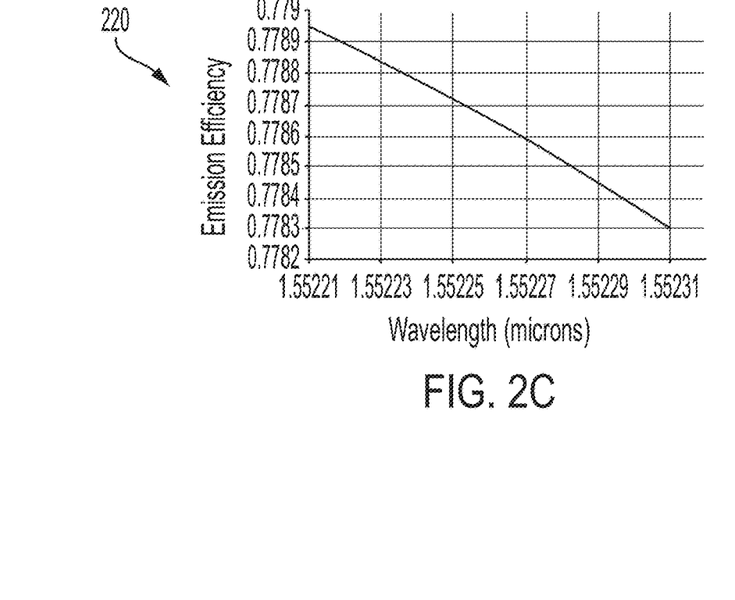
FIG. 2C is a plot of simulated emission efficiency vs. wavelength for the chip-scale emitter of FIG. 1.

FIGS. 2A-2B are emission profiles from numerically generated simulations corresponding to the chip-scale emitter 100 configuration shown in FIG. 1. FIG. 2A is a side view of a near-field emission profile 200 for a chip-scale emitter having the features shown in FIG. 1 where the resonator has a resonant mode at 1552 nm. FIG. 2B is a top view of a far-field emission profile 210 of such a chip-scale emitter, which has a full width at half maximum (FWHM) of approximately +/−50 degrees along both the x and y axes. FIG. 2C is an emission efficiency spectrum 220 from numerically generated simulations corresponding to the chip-scale emitter 100 configuration shown in FIG. 1. The particular configuration of the chip-scale emitter in FIG. 1 has an emission efficiency of approximately 78%, which represents approximately 1 dB of loss.

Figure 3:
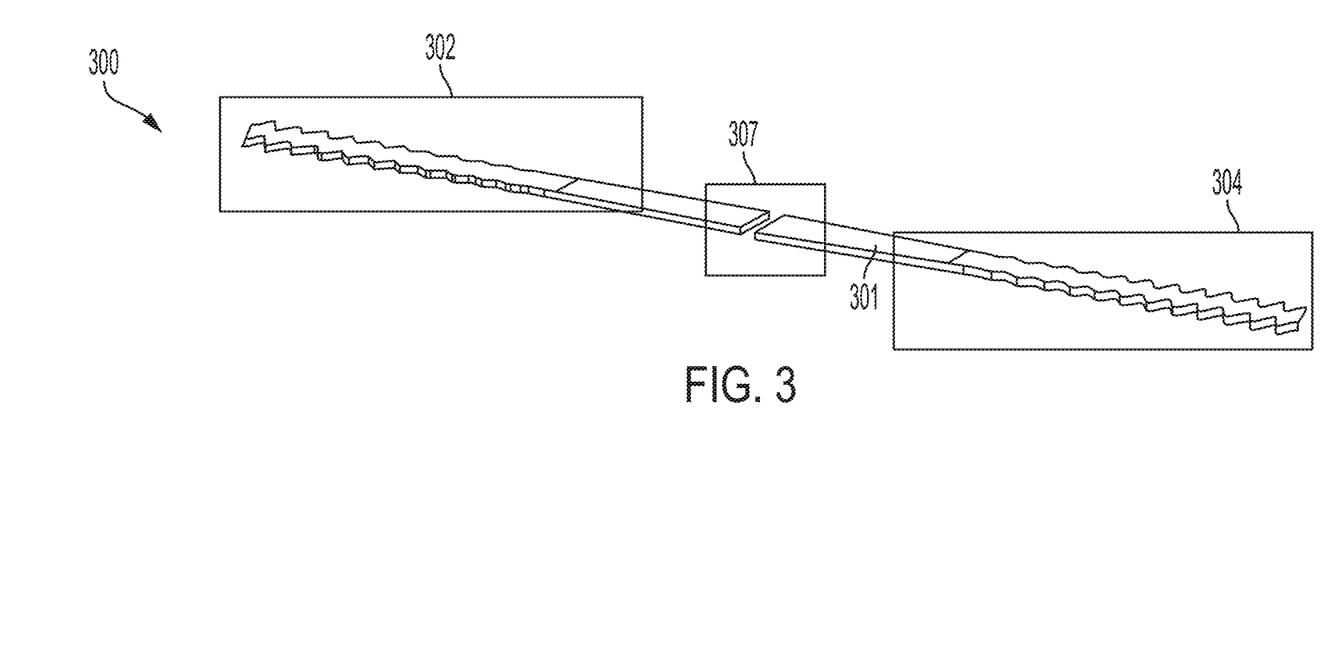
FIG. 3 is a schematic diagram of an example chip-scale emitter.

FIG. 3 is a schematic diagram of an example alternative chip-scale emitter 300. In the example shown in FIG. 3, the chip-scale emitter 300 includes a first grating 302, a second grating 304, and a single scattering element 307 in a waveguide 301. The functions, structures, and other description of liked-named elements for such examples described herein may apply to like named elements of chip-scale emitter 300 and vice versa.

The waveguide 301 of the chip-scale emitter 300 is generally formed from a material that has a refractive index greater than about 1.6. In some examples, the waveguide material is silicon nitride. In other examples, the waveguide material can be silicon, titanium dioxide, aluminum oxide, hafnium oxide, lithium niobite, or any other material having a refractive index greater than about 1.6.

In some examples, the waveguide 301 is covered with a cladding material having a refractive index less than the refractive index of the waveguide material. In some examples where the waveguide material is silicon nitride, the cladding material is silicon dioxide. In other examples, the cladding material can be formed from any material having a refractive index less than the refractive index of the waveguide material, so the particular cladding material is dependent on (or paired with) the waveguide material.

In the example shown in FIG. 3, the first grating 302 and the second grating 304 are separated from each other in the waveguide 301 and form a resonator in the waveguide 301. In the example shown in FIG. 3, the first grating 302 and the second grating 304 are each formed by periodically varying the width of the waveguide 301 in a manner that creates a highly reflective segment and mimics a mirror. In some examples, the first grating 302 and the second grating 304 have a sine wave pattern. In other examples, the first grating 302 and the second grating 304 could have other periodically varying patterns (such as, for example, a square wave pattern). In some examples, the first grating 302 and the second grating 304 are Bragg mirrors (also referred to as Bragg reflectors).

In some examples, the chip-scale emitter 300 is designed to diffract out multiple wavelengths of light. In such examples, the first grating 302 and the second grating 304 are formed by varying the width of the waveguide in a pattern that creates a highly reflective segment and mimics a mirror. In particular, the pattern includes two grating patterns with different periods that are superimposed.

In other examples, the first grating 302 and the second grating 304 are formed with a periodic array of holes in the waveguide 301 in addition to (or instead of) periodically varying the width of the waveguide 301. In such examples, the holes are sub-wavelength in the waveguide 301 and are sufficiently small such that the collection of holes is highly reflective but do not operate as efficient scattering elements. The shape, size, and/or pitch/spacing of the sub-wavelength holes can be selected to accommodate the desired reflectivity of the first grating 302 and the second grating 304 and mimic mirrors. In some examples, the size of the sub-wavelength holes is apodized such that the size of the sub-wavelength holes is reduced near the scattering element 306, which is beneficial for reducing loss for the chip-scale emitter 300 and reducing scattering of light other than the intended scattering with the scattering element 306.

In the example shown in FIG. 3, the amplitude of the pattern for the first grating 302 and the second grating 304 is apodized such that the width of the amplitude of the periodic pattern forming the first grating 302 and the second grating 304 is reduced near the scattering element 306. In some examples, the size of holes forming the first grating 302 and the second grating 304 is apodized such that the size of the holes is reduced near the scattering element 306. The apodization of the first grating 302 and the second grating 304 is beneficial for reducing loss for the chip-scale emitter 300 and reducing scattering of light other than the intended scattering with the scattering element 306.

The scattering element 307 of the chip-scale emitter 300 is a single defect in the waveguide 301. The scattering element 307 is positioned between the first grating 302 and the second grating 304 in the waveguide 301 such that the single defect in the waveguide 301 that forms the scattering element 307 is within the resonator formed by the first grating 302 and the second grating 304. In the example shown in FIG. 3, the single defect that forms the scattering element 307 is a gap or void in the waveguide 301. In some examples, the gap or void in the waveguide 301 can be implemented with different shapes depending on the desired far-field emission pattern or profile. In some examples, the shape of the gap or void in the waveguide 301 is circular, elliptical, square-shaped, or the like. The particular dimensions of the gap or void in the waveguide 301 can be used to achieve the particular desired far-field emission pattern or profile.

In operation, an optical signal (for example, from a light source) is coupled into the chip-scale emitter 300 from a waveguide optically coupled to the chip-scale emitter 300. The optical signal enters the chip-scale emitter 300 at the side of the first grating 302 and resonates within the optical cavity (resonator) formed by the first grating 302 and the second grating 304. The light propagates through (is sampled by) the single defect that forms the scattering element 307 multiple times as it is reflected by the first grating 302 and the second grating 304. Due to the additional sampling of light, the single scattering element 307 and the chip-scale emitter 300 generally provides a highly divergent output at a power level that is significantly improved compared to grating couplers or a single defect without a resonator.

Figure 4A:
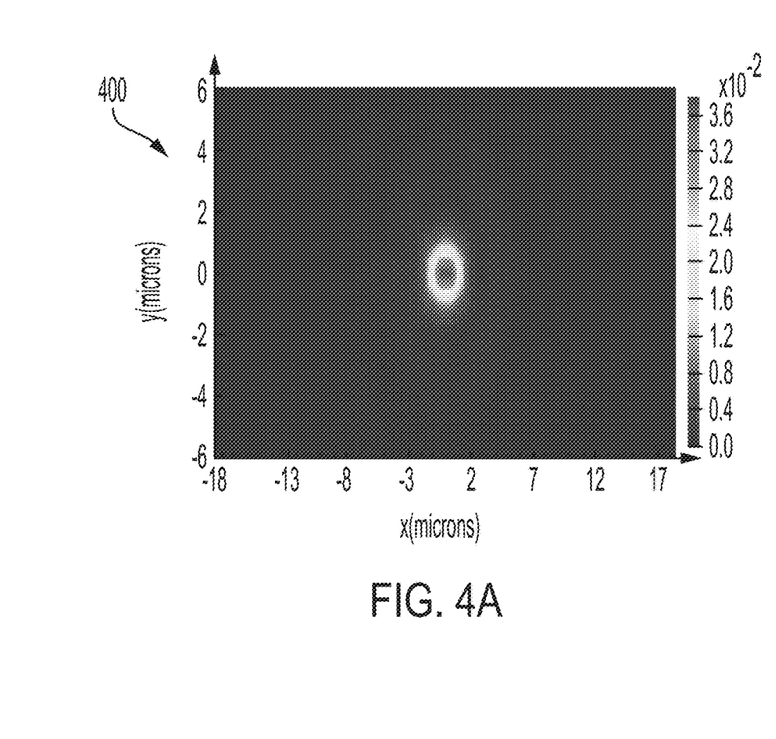
FIG. 4A is a simulated near-field emission profile for the chip-scale emitter of FIG. 3.
Figure 4B:
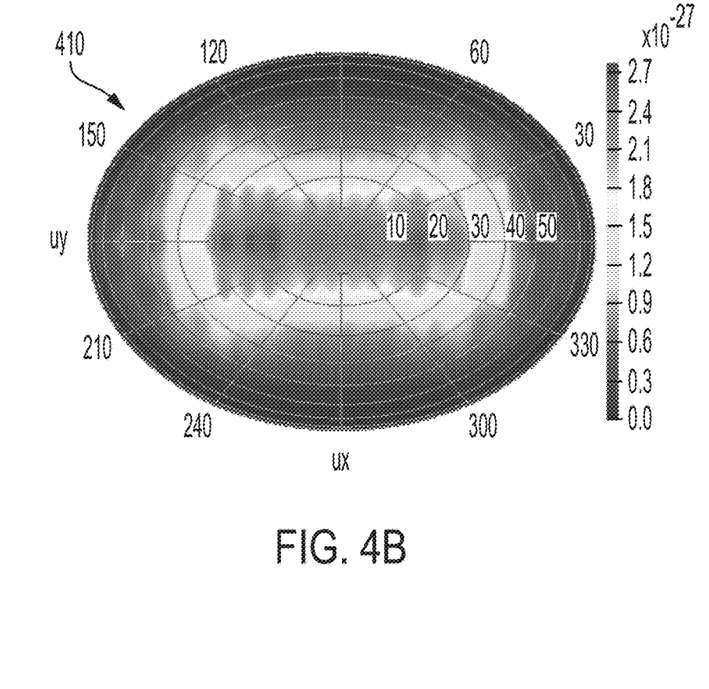
FIG. 4B is a simulated far-field emission profile for the chip-scale emitter of FIG. 3.
Figure 4C:
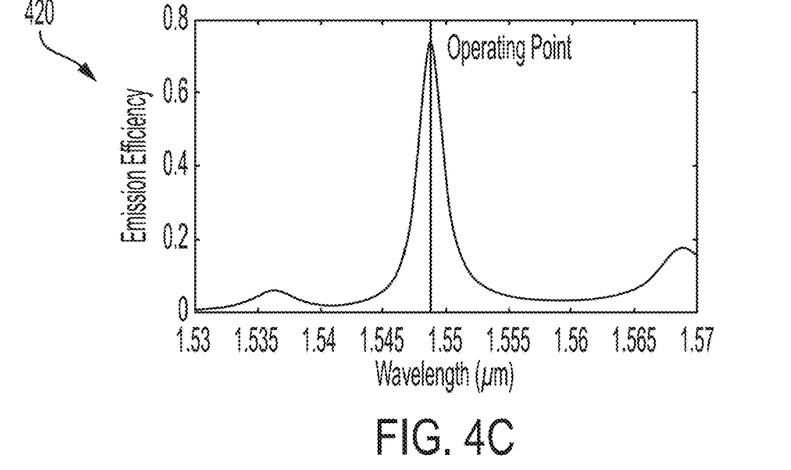
FIG. 4C is a plot of simulated emission efficiency vs. wavelength for the chip-scale emitter of FIG. 3.

FIGS. 4A-4B are emission profiles from numerically generated simulations corresponding to the chip-scale emitter 300. FIG. 4A is a top view of a near-field emission profile 400 for a chip-scale emitter having the features shown in FIG. 3. FIG. 4B is a top view of a far-field emission profile 410 of such a chip-scale emitter, which has approximately +/−30 degrees FWHM in the y axis and +/−40 degrees FWHM in the x axis. FIG. 4C is an emission efficiency spectrum 420 from numerically generated simulations corresponding to the chip-scale emitter 300 configuration shown in FIG. 3. The particular configuration of the chip-scale emitter in FIG. 3 has an emission efficiency of approximately 75% at the operating point, which represents approximately 1 dB of loss.

Figure 5:
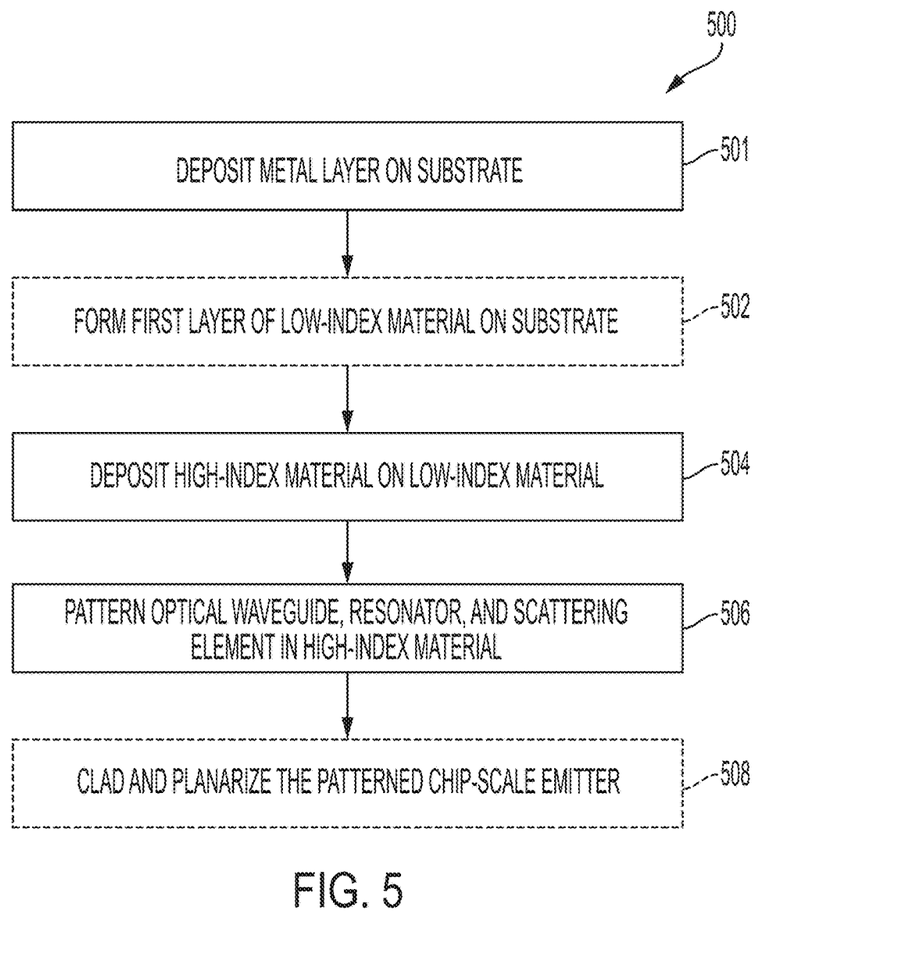
FIG. 5 is a flow diagram of an example method of manufacturing a chip-scale emitter.

FIG. 5 is a flow diagram of an example method 500 of manufacturing a chip-scale emitter. The functions, structures, and other description of liked-named elements for such examples described herein may apply to like-named elements described with reference to the method 500 and vice versa.

The manufacture of the chip-scale emitter (such as, for example, chip-scale emitters 100, 300) starts with a substrate composed of a single material. In some examples, the substrate is a silicon wafer. In other examples, the substrate is a glass substrate.

The method 500 begins with depositing a layer of metal on the substrate (block 501). In some examples, the layer of metal is gold and has a thickness of approximately 250 nm to 1 μm. In other examples, different metals and thicknesses could also be used.

In some examples, the method 500 optionally continues with forming a first layer of a low refractive index, transparent material (referred to herein as "low-index material") on the substrate (block 502). In some examples, forming a first layer of a low-index material includes a thermal oxidation process to generate a thermal oxide. In other examples, the first layer is formed using a chemical vapor deposition (CVD) process, for example, CVD may be used when there is a metal on the substrate. In some examples, the first layer of low-index material has a thickness of approximately 1 μm to 10 μm. In some examples, the low-index material is silicon dioxide. It should be understood that other low-index materials could also be used depending on the materials used for the waveguide as discussed herein. In examples where a glass substrate is used, this step of the method 500 can be omitted.

The method proceeds with depositing a high refractive index, transparent material (referred to herein as "high-index material") on the low-index material (block 504). In some examples, the high-index material has a thickness of approximately 100 nm to 1 μm. The high-index material has a refractive index greater than about 1.6. In some examples, the high-index material is silicon nitride. In other examples, the high-index material can be silicon, titanium dioxide, aluminum oxide, hafnium oxide, lithium niobite, or any other material having a refractive index greater than about 1.6. The high-index material and the low-index material are be selected together. For example, the low-index material can be any material having a refractive index less than the refractive index of the waveguide material, so the particular low-index material used is dependent on (or paired with) the high-index material.

The method proceeds with patterning and etching a coupled waveguide, a resonator, and a single scattering element in the high-index material (block 506). In some examples, the footprint and geometry of the coupled waveguide, resonator, and single scattering element are patterned using electron beam lithography or photolithography, for example, and then etched into the high-index material.

The method 500 optionally proceeds with cladding and planarizing the chip-scale emitter (block 508). In some examples, cladding the chip-scale emitter comprises depositing a second layer of the low-index material. In some examples where the high-index material is silicon nitride, the cladding material is silicon dioxide. In other examples, the cladding material can be formed from any material having a refractive index less than the waveguide material. In some examples, planarizing the top surface of the chip-scale emitter is performed using chemical mechanical polishing. In examples where a glass substrate is used, this step of the method can be omitted.

Figure 6:
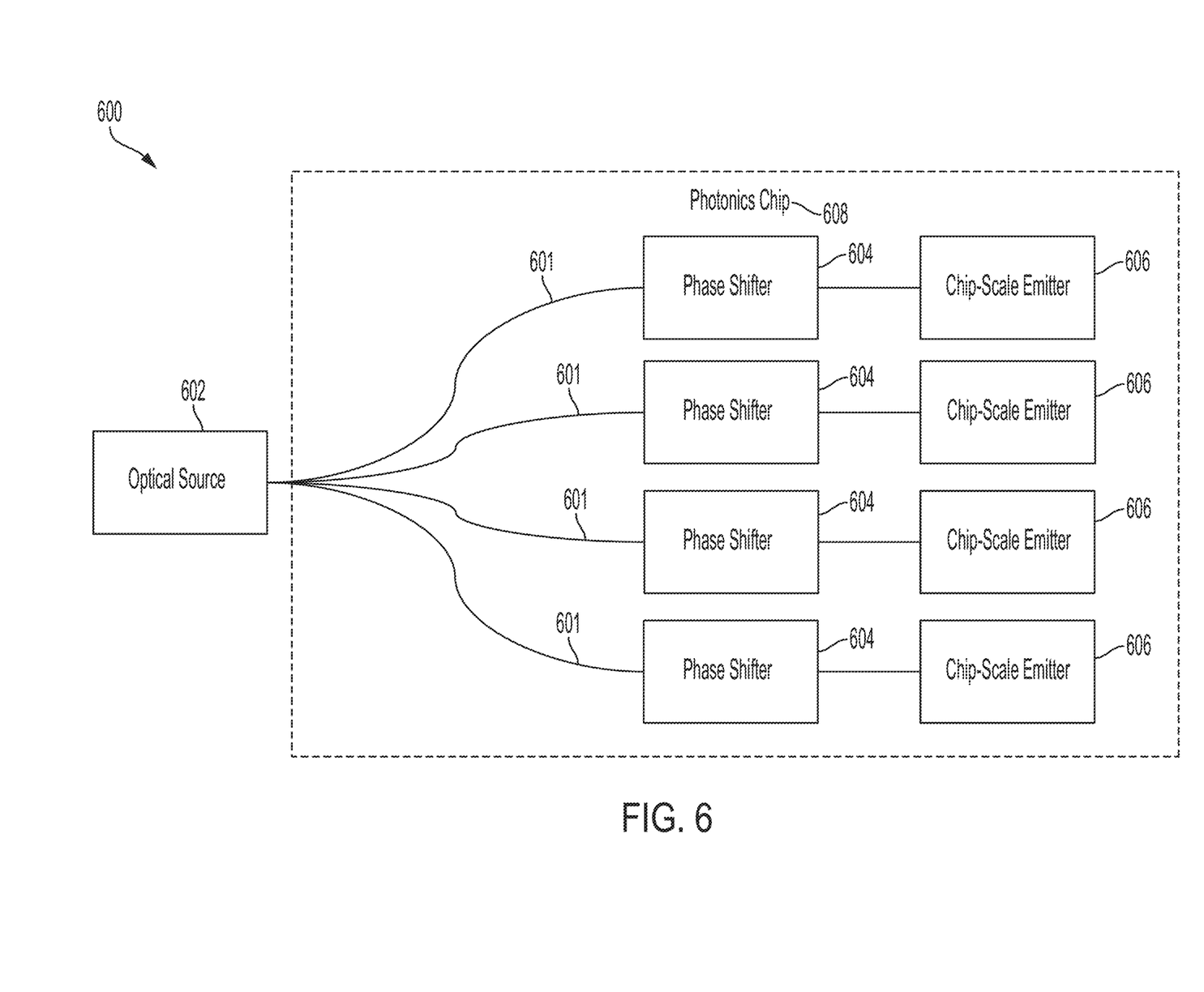
FIG. 6 is a block diagram of an example optical phased array.

FIG. 6 is a block diagram of an example optical phased array 600 that can include the chip-scale emitters 100, 300 as described above. In the example shown in FIG. 6, the optical phased array 600 includes an optical source 602 and a plurality waveguides 601 optically coupled to phase shifters 604 and a distribution of chip-scale emitters 606 (such as, for example, chip-scale emitters 100, 300). While four waveguides 601, phase shifters 604, and chip-scale emitters 606 are shown in FIG. 6, it should be understood that this is for ease of illustration and different amounts of waveguides 601, phase shifters 604, and chip-scale emitters 606 could also be used for the optical phased array 600.

The waveguides 601 guide light or an optical signal from an optical source 602 to the scattering elements of the chip-scale emitters 606, which couple the light out into free space (far-field). In some examples, the chip-scale emitters 606 are arranged in a two-dimensional grid array. In other examples, the chip-scale emitters 606 can be alternatively arranged in a circular, elliptical, or semi-circular array around a perimeter. Other configurations for the chip-scale emitters 606 of the optical phased array 600 are also possible.

In some examples, the optical source 602 (also referred to as a "light source") is a laser or other coherent light source (for example, a vertical cavity surface emitting laser (VCSEL), an external cavity laser, or the like). In some examples, the waveguides 601 are optically coupled to the optical source 602 using a splitter (not shown). The light from all of the scattering elements of the chip-scale emitters 606 overlaps and forms a composite beam that can be steered by controlling the relative phase of light in each waveguide channel.

In the optical phased array 600, the phase shifters are used to control the phase of the light that is output by the emitters 606. In some examples, the phase shifters 604 are microheaters, such that phase-shifting is accomplished by the thermo-optic effect. In other examples, the phase shifters are formed from an electro-optic material (for example, LiNbO3), and the optical phased array 600 is configured to tune the phase shifters based on an electro-optic effect. In some examples, driving electrodes for the phase shifters 604 are included in the fabrication.

In some examples, the chip-scale emitters 100, 300 can also be integrated in a photonics chip 608. The photonics chip 608 may include all or a subset of the components of the optical phased array 600 described above. In the example shown in FIG. 6, the photonics chip 608 includes the plurality of waveguides 601 and respective chip-scale emitters 606, but the photonics chip 608 relies on a non-integrated light source 602. In other examples, the photonics chip 608 includes the plurality of waveguides 601, chip-scale emitter(s) 606, and an integrated light source 602. In some examples, the photonics chip 608 can also include integrated phase shifters 604 and/or driving electrodes for the phase shifters 604 in addition to the components discussed above.

In some examples, the chip-scale emitters 606 are formed into two or more groups or subsets forming two or more arrays that can be multiplexed to provide different functions. Each subset of chip-scale emitters 606 has a different scattering element. For example, in an embodiment with the chip-scale emitters 606 divided into two subsets, the first subset of chip-scale emitters 606 has a first type of scattering element and the second subset of chip-scale emitters 606 has a second, different type of scattering element. For example, the first and second subsets could be used to implement different beam steering (coarse and fine tuning). Such arrays of chip-scale emitters 606 could be multiplexed to provide any appropriate functions for the optical phased array 600.

The chip-scale emitters described herein provide significant benefits compared with current designs. The chip-scale emitters with a single emitting defect positioned in a resonator achieve higher divergence and emission/diffraction efficiency while maintaining a small size suitable for integration in a photonics chip. The chip-scale emitters can be used in optical phased arrays, for example, and are be particularly advantageous for LiDAR and Li-Fi applications, which desire and/or require optical transmission/beam steering over the large angular ranges.

EXAMPLE EMBODIMENTS

Example 1 includes an optical phased array, comprising: an optical source; first waveguides optically coupled to the optical source; one or more phase shifters, wherein each respective phase shifter of the one or more phase shifters is positioned along a portion of a respective first waveguide of the first waveguides; and first chip-scale emitters, wherein each respective first chip-scale emitter of the first chip-scale emitters comprises: a first grating formed in the respective first waveguide; a second grating formed in the respective first waveguide, wherein the second grating is separate from the first grating, wherein the first grating and the second grating form a resonator; and a scattering element consisting of a single defect in the respective first waveguide, wherein the scattering element is positioned between the first grating and the second grating in the respective first waveguide.

Example 2 includes the optical phased array of Example 1, wherein the single defect comprises a single abrupt change in the width of the respective first waveguide.

Example 3 includes the optical phased array of any of Example 1, wherein the single defect is a single gap in the respective first waveguide.

Example 4 includes the optical phased-array of Example 3, wherein the single gap is circular, elliptical, or squared-shaped.

Example 5 includes the optical phased array of any of Examples 1-4, wherein the first grating and the second grating are apodized.

Example 6 includes the optical phased array of any of examples 1-5, wherein the first chip-scale emitters are configured with first scattering elements and further including second chip-scale emitters that are configured with second, different scattering elements.

Example 7 includes the optical phased array of any of Examples 1-6, wherein the one or more phase shifters are microheaters configured to be tuned through a thermo-optic effect.

Example 8 includes the optical phased array of any of Examples 1-7, wherein the one or more phase shifters are formed from an electro-optic material configured to be tuned through an electro-optic effect.

Example 9 includes a chip-scale emitter, comprising: a resonator formed in a waveguide, wherein the resonator includes a first grating formed in the waveguide and a second grating formed in the waveguide that is separate from the first grating; and a scattering element consisting of a single defect in the waveguide, wherein the scattering element is positioned between the first grating and the second grating in the waveguide.

Example 10 includes the chip-scale emitter of Example 9, wherein the single defect comprises a single abrupt change in width in the waveguide.

Example 11 includes the chip-scale emitter of any of Examples 9-10, wherein the single defect is a single hole in the waveguide.

Example 12 includes the chip-scale emitter of Example 11, wherein the single hole is circular, elliptical, or squared-shaped.

Example 13 includes the chip-scale emitter of any of Examples 9-12, wherein the first grating and the second grating are apodized.

Example 14 includes the chip-scale emitter of any of Examples 9-13, wherein the first grating and the second grating comprise periodic structures in the waveguide.

Example 15 includes the chip-scale emitter of Example 14, wherein the periodic structures in the waveguide comprise sub-wavelength holes in the waveguide.

Example 16 includes the chip-scale emitter of any of Examples 9-15, wherein the first grating and the second grating comprise Bragg mirrors.

Example 17 includes a photonics chip, comprising: a plurality of waveguides; and a plurality of chip-scale emitters optically coupled to the plurality of waveguides, wherein each chip-scale emitter of the plurality of chip-scale emitters includes: a resonator formed in a respective waveguide, wherein the resonator includes a first grating formed in the respective waveguide and a second grating formed in the respective waveguide that is separate from the first grating; and a scattering element consisting of a single defect in the respective waveguide, wherein the scattering element is positioned between the first grating and the second grating in the respective waveguide.

Example 18 includes the photonics chip of Example 17, wherein the single defect comprises a single abrupt change in width in the respective waveguide.

Example 19 includes the chip-scale emitter of any of Examples 17-18, wherein the single defect comprises a single gap in the respective waveguide, wherein the single gap is circular, elliptical, or squared-shaped.

Example 20 includes the photonics chip of any of Examples 17-19, further comprising an optical source integrated on the photonics chip, wherein the optical source is optically coupled to the plurality of waveguides.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical phased array, comprising:
   an optical source;
   first waveguides optically coupled to the optical source;
   one or more phase shifters, wherein each respective phase shifter of the one or more phase shifters is positioned along a portion of a respective first waveguide of the first waveguides; and
   first chip-scale emitters, wherein each respective first chip-scale emitter of the first chip-scale emitters comprises:
   a first grating formed in the respective first waveguide;
   a second grating formed in the respective first waveguide, wherein the second grating is separate from the first grating, wherein the first grating and the second grating form a resonator; and
   a scattering element consisting of a single defect in the respective first waveguide, wherein the scattering element is positioned between the first grating and the second grating in the respective first waveguide.

2. The optical phased array of claim 1, wherein the single defect comprises a single abrupt change in the width of the respective first waveguide.

3. The optical phased array of claim 1, wherein the single defect is a single gap in the respective first waveguide.

4. The optical phased-array of claim 3, wherein the single gap is circular, elliptical, or squared-shaped.

5. The optical phased array of claim 1, wherein the first grating and the second grating are apodized.

6. The optical phased array of claim 5, wherein the first chip-scale emitters are configured with first scattering elements and further including second chip-scale emitters that are configured with second, different scattering elements.

7. The optical phased array of claim 1, wherein the one or more phase shifters are microheaters configured to be tuned through a thermo-optic effect.

8. The optical phased array of claim 1, wherein the one or more phase shifters are formed from an electro-optic material configured to be tuned through an electro-optic effect.

9. A chip-scale emitter, comprising:
   a resonator formed in a waveguide, wherein the resonator includes a first grating formed in the waveguide and a second grating formed in the waveguide that is separate from the first grating; and
   a scattering element consisting of a single defect in the waveguide, wherein the scattering element is positioned between the first grating and the second grating in the waveguide.

10. The chip-scale emitter of claim 9, wherein the single defect comprises a single abrupt change in width in the waveguide.

11. The chip-scale emitter of claim 9, wherein the single defect is a single hole in the waveguide.

12. The chip-scale emitter of claim 11, wherein the single hole is circular, elliptical, or squared-shaped.

13. The chip-scale emitter of claim 9, wherein the first grating and the second grating are apodized.

14. The chip-scale emitter of claim 9, wherein the first grating and the second grating comprise periodic structures in the waveguide.

15. The chip-scale emitter of claim 14, wherein the periodic structures in the waveguide comprise sub-wavelength holes in the waveguide.

16. The chip-scale emitter of claim 9, wherein the first grating and the second grating comprise Bragg mirrors.

17. A photonics chip, comprising:
a plurality of waveguides; and
a plurality of chip-scale emitters optically coupled to the plurality of waveguides, wherein each chip-scale emitter of the plurality of chip-scale emitters includes:
a resonator formed in a respective waveguide, wherein the resonator includes a first grating formed in the respective waveguide and a second grating formed in the respective waveguide that is separate from the first grating; and
a scattering element consisting of a single defect in the respective waveguide, wherein the scattering element is positioned between the first grating and the second grating in the respective waveguide.

18. The photonics chip of claim 17, wherein the single defect comprises a single abrupt change in width in the respective waveguide.

19. The chip-scale emitter of claim 17, wherein the single defect comprises a single gap in the respective waveguide, wherein the single gap is circular, elliptical, or squared-shaped.

20. The photonics chip of claim 17, further comprising an optical source integrated on the photonics chip, wherein the optical source is optically coupled to the plurality of waveguides.

* * * * *